(12) United States Patent
Thienel et al.

(10) Patent No.: US 12,351,008 B2
(45) Date of Patent: Jul. 8, 2025

(54) DOOR MODULE FOR A VEHICLE DOOR, VEHICLE DOOR AND PRODUCTION METHOD

(71) Applicant: Brose Fahrzeugteile SE & Co. Kommanditgesellschaft, Bamberg, Bamberg (DE)

(72) Inventors: Michael Thienel, Thurnau (DE); Eike Ritthaler, Bischberg (DE); André Carl, Coburg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 896 days.

(21) Appl. No.: 17/283,634

(22) PCT Filed: Oct. 7, 2019

(86) PCT No.: PCT/EP2019/077099
§ 371 (c)(1),
(2) Date: Apr. 8, 2021

(87) PCT Pub. No.: WO2020/074450
PCT Pub. Date: Apr. 16, 2020

(65) Prior Publication Data
US 2021/0347234 A1    Nov. 11, 2021

(30) Foreign Application Priority Data
Oct. 8, 2018    (DE) .................... 20 2018 105 741.3

(51) Int. Cl.
*B60J 5/04*    (2006.01)
*B29C 45/14*    (2006.01)
*B29L 31/30*    (2006.01)

(52) U.S. Cl.
CPC ....... *B60J 5/0463* (2013.01); *B29C 45/14688* (2013.01); *B29L 2031/3014* (2013.01); *B29L 2031/3055* (2013.01)

(58) Field of Classification Search
None
See application file for complete search history.

(56) References Cited

U.S. PATENT DOCUMENTS 12,172,350 B2 * 12/2024 Thienel ............... B29C 45/0062
2007/0046064 A1 * 3/2007 Winborn ................ B60J 5/0418
296/146.7

(Continued)

FOREIGN PATENT DOCUMENTS

CN    102235143 A    11/2011
CN    203713981 U    7/2014

(Continued)

OTHER PUBLICATIONS

Chinese Office Action for CN 201980062997.4, Dated Mar. 31, 2023, English translation attached to original, All together 19 Pages.

(Continued)

*Primary Examiner* — Gregory A Blankenship
(74) *Attorney, Agent, or Firm* — Dickinson Wright PLLC

(57) ABSTRACT

A door module for a vehicle door, having at least one region, which is substantially formed by an organosheet. In particular, the door module has at least two different types of organosheet, by means of which different regions of the door module are formed.

9 Claims, 11 Drawing Sheets

(56) References Cited

U.S. PATENT DOCUMENTS

| | | | |
|---|---|---|---|
| 2011/0254311 A1 | 10/2011 | Dajek et al. | |
| 2014/0110964 A1 | 4/2014 | Schijve et al. | |
| 2014/0210233 A1* | 7/2014 | Brymerski | B29C 44/08 |
| | | | 264/46.5 |
| 2016/0136870 A1* | 5/2016 | Thienel | B29C 45/14221 |
| | | | 428/300.7 |
| 2016/0214655 A1* | 7/2016 | Demange | B60J 5/0416 |
| 2016/0251039 A1* | 9/2016 | Iwano | B60J 5/0481 |
| | | | 296/181.2 |
| 2017/0166038 A1* | 6/2017 | Jang | B60J 5/0483 |
| 2017/0174055 A1 | 6/2017 | Demange | |
| 2017/0210210 A1 | 7/2017 | Lange | |
| 2017/0274742 A1* | 9/2017 | Lange | B60J 5/0402 |
| 2018/0056760 A1* | 3/2018 | Hümmer | B60J 5/0463 |
| 2018/0117999 A1* | 5/2018 | Thienel | B60J 5/0463 |
| 2018/0134130 A1* | 5/2018 | Nagaishi | B60J 5/0461 |
| 2019/0184799 A1* | 6/2019 | Kerschbaum | B60J 5/107 |
| 2019/0217689 A1* | 7/2019 | Bonte | B60J 5/0433 |
| 2019/0366813 A1* | 12/2019 | Grond-Soons | B60J 5/107 |
| 2020/0298742 A1* | 9/2020 | Thienel | B60P 1/649 |
| 2020/0376727 A1* | 12/2020 | Thienel | B29C 45/0062 |
| 2021/0001574 A1* | 1/2021 | Wettermark | B29C 70/682 |
| 2021/0300161 A1* | 9/2021 | Fortin | B60J 5/0463 |
| 2021/0347234 A1* | 11/2021 | Thienel | B60J 5/0416 |
| 2022/0169097 A1* | 6/2022 | Teshima | B60J 5/0444 |
| 2022/0324310 A1* | 10/2022 | Aitharaju | B60J 5/107 |
| 2022/0332262 A1* | 10/2022 | Hamdoon | B60R 13/0243 |
| 2024/0010056 A1* | 1/2024 | Skorka | B60J 5/0481 |

FOREIGN PATENT DOCUMENTS

| | | |
|---|---|---|
| CN | 104736362 A | 6/2015 |
| CN | 205417114 U | 8/2016 |
| CN | 107009854 A | 8/2017 |
| DE | 102007014258 A1 | 10/2007 |
| DE | 102007037680 A1 | 2/2009 |
| DE | 102012023588 A1 | 7/2013 |
| DE | 102013105080 A1 | 11/2014 |
| DE | 102015012262 A1 | 3/2017 |
| WO | 2015022174 A1 | 2/2015 |
| WO | 2019158436 A1 | 8/2019 |

OTHER PUBLICATIONS

Chinese Office Action for CN 201980062997.4 dated Aug. 18, 2023, English Translation attached to original, All together 18 Pages.

* cited by examiner

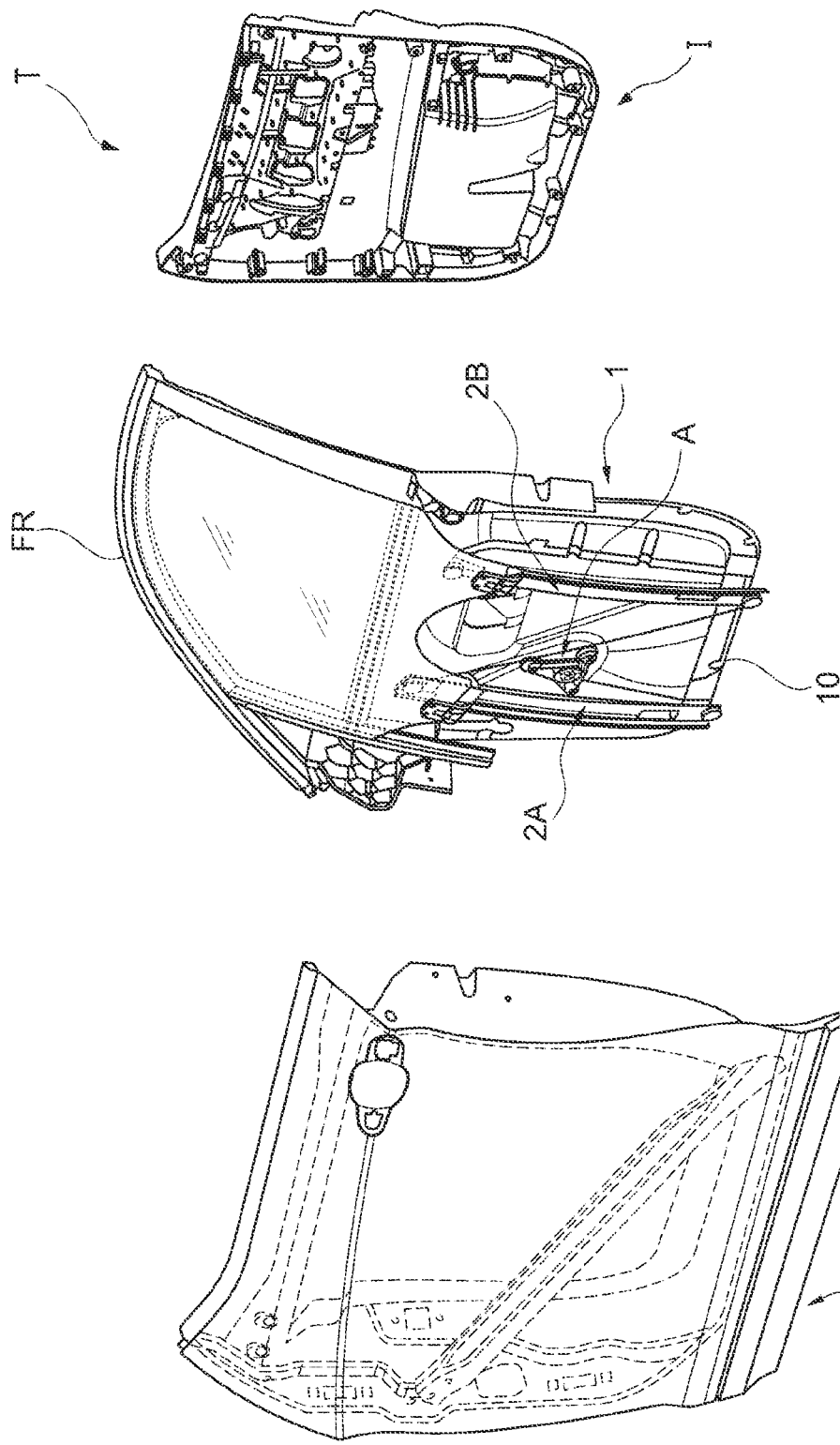

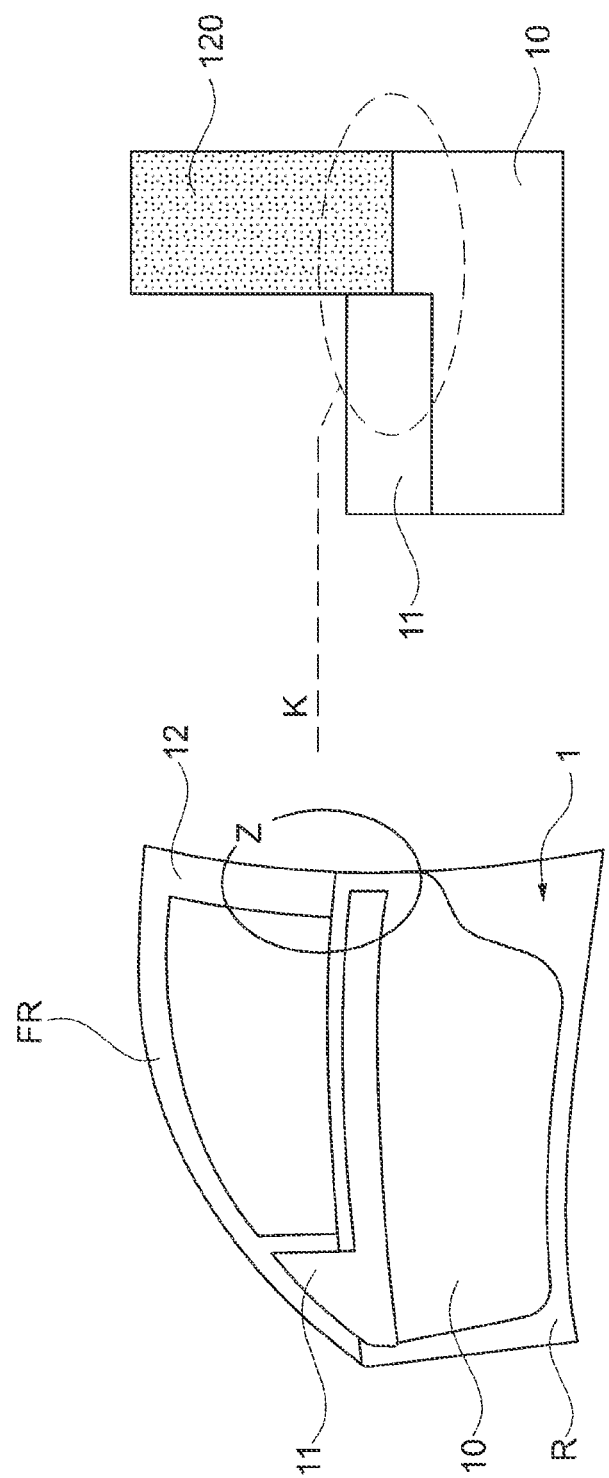

DOOR MODULE FOR A VEHICLE DOOR, VEHICLE DOOR AND PRODUCTION METHOD

CROSS-REFERENCE TO RELATED APPLICATIONS

This application is the U.S. National Phase of PCT Application No. PCT/EP2019/077099 filed on Oct. 7, 2019, which claims priority to German Patent Application No. DE 20 2018 105 741.3, filed on Oct. 8, 2018, the disclosures of which are hereby incorporated in their entirety by reference herein.

TECHNICAL FIELD

The proposed disclosure relates to a door module for a vehicle door, to a vehicle door and to a production method.

BACKGROUND

A door module, as part of a vehicle door formed therewith, usually bears a plurality of functional elements, such as, for example, parts of a window regulator for adjusting a window pane of the motor vehicle door, at least one speaker or parts of a door locking system. It is known to form such a carrier region, which frequently extends in an areal manner, of such a door module substantially by way of an organo sheet.

SUMMARY

Against this background, the proposed solution is based on the object of further improving the use of organo sheet for vehicle doors.

In the context of the proposed solution, provision is for example made for a door module for a vehicle door to be provided, in the case of which module at least two different types of organo sheet are provided for the formation of different regions of the door module.

As a result of the use of different types of organo sheet, it is possible to provide types of organo sheet which are adapted in dependence on the function and loading of the respective region of the door module. The different types of organo sheet then differ from one another here for example with regard to material thickness, the materials of the reinforcing fibers, the alignment of the reinforcing fibers and/or the number of fiber layers present. The proposed solution thus in particular involves forming a door module in the case of which use is made of a particular type of an organo sheet, or of particular types of an organo sheet in combination, merely in certain regions.

Whereas for example a large part of a carrier area of the door module is formed by a first type of organo sheet, it is alternatively or additionally possible to at least locally provide a further type of organo sheet on the door module. By way of example, in this connection, provision can be made for a first type of organo sheet with a comparatively low material thickness to be utilized for the formation of a carrier region of the door module, and thus said first type of organo sheet defines a large part of the carrier area of the door module, on which functional components of the vehicle doors, such as, for example, parts of a window regulator, a speaker and/or parts of a door lock are attached. At least one further type of organo sheet is then connected to said first type of organo sheet, for example in order to locally stiffen the carrier region and/or to form a further functional region on the module in addition to the carrier region. In this way, it is for example possible to provide a reinforcement with another type of organo sheet in a sill region of the door module, which defines at least a part of a window sill of the vehicle door when the door module is in the properly assembled state in a vehicle door. A further functional region of the door module, said further functional region being formed by way of another type of organo sheet, may for example be a frame region which at least partially defines a window frame bordering a window opening on the fully assembled vehicle door.

In principle, it is also possible for more than two different types of organo sheet to be used. Provision can in particular be made for the door module to have at least three different types of organo sheet, with which different regions of the door module are formed.

For connection of the different types of organo sheet, said types of organo sheet can at least partially overlap one another in one or more embodiments. In this way, in an overlap region of at least two different types of organo sheets, it is for example possible to provide a positively locking connection of the different types of organo sheets by way of injection-molded plastic material. By way of example, in one or more embodiments plastic material is thus then overmolded on and/or injected through overlap regions of two different types of organo sheets on the door module in such a way that the at least two different types of organo sheet are fixed to one another in a positively locking manner in the overlap region by way of the plastic material.

By way of example, a first type of organo sheet has a single-layered woven fabric, a single-layered laid scrim, a single-layered knitted fabric or a single-layered UD tape (that is to say a unidirectional tape composed of reinforcing fibers which are embedded in plastic material). Alternatively or additionally, the first type of organo sheet, with which for example a large part of the carrier area of the door module is then formed, can have a material thickness in the range from 0.4 mm to 1 mm, in particular in the range from 0.4 mm to 0.8 mm.

By contrast, a second type of organo sheet then has, for example, a multi-layered woven fabric, a multi-layered laid scrim, a multi-layered knitted fabric or a multi-layered UD tape and/or a material thickness in the range from 0.4 mm to 4 mm, in particular in the range from 0.9 mm to 2.8 mm. Here, in contrast with a first type of organo sheet, a second type of organo sheet is consequently formed with at least one fiber layer more and/or with a greater material strength and thus material thickness.

In one or more embodiments, at least three different types of organo sheets are provided on the door module, wherein
  a first type of organo sheet has a single-layered woven fabric, a single-layered laid scrim, a single-layered knitted fabric or a single-layered UD tape and/or a material thickness in the range from 0.4 mm to 1 mm, in particular in the range from 0.4 mm to 0.8 mm,
  a second type of organo sheet has a multi-layered woven fabric, a multi-layered laid scrim, a multi-layered knitted fabric or a multi-layered UD tape and/or a material thickness in the range from 0.4 mm to 2.0 mm, in particular in the range from 0.9 mm to 1.8 mm, and
  a third type of organo sheet has a material thickness in the range from 1.8 mm to 4.0 mm, in particular in the range from 1.8 mm to 2.8 mm.

Here, it is in principle possible for the third type of organo sheet to likewise be of multi-layered construction.

In the context of a proposed method for producing a door module for a vehicle door, provision is for example made for at least two organo sheet blanks to be provided and at least one region of the door module to be formed with the organo sheet blanks, wherein at least two different types of organo sheet, and organo sheet blanks formed therefrom, are used in order to form different regions of the door module.

The production method proposed here is thus based on the same fundamental concept as a proposed door module, in the case of which different regions of the door module are formed by means of different types of organo sheet. For this purpose, the different types of organo sheet can for example overlap and/or can also be provided so as not to overlap one another at least in certain regions.

In one or more embodiments of a proposed production method, the different types of organo sheet can also differ from one another with regard to material thickness, the materials of the reinforcing fibers used in an organo sheet, the alignment of the reinforcing fibers and/or the number of fiber layers present in an organo sheet. As already explained, the organo sheet blanks made from the at least two different types of organo sheets can be arranged so as to at least partially overlap with one another, for example in order to locally influence the stiffness of the door module, in particular to increase a stiffness of a region of the door module, by way of a further type of organo sheet and/or in order to be able to locally connect the organo sheet blanks to one another in a more simple manner.

In one or more embodiments of the proposed method, a plastic material can be injection-molded onto at least one part of at least one of the organo sheet blanks. It is for example possible for a positively locking connection of mutually overlapping organo sheet blanks to be achieved by means of the injection-molded plastic material. By way of example, it is thus possible for passage openings which at least partially overlap one another to be formed on overlapping portions of at least two organo sheet blanks. If plastic material is then subsequently injected through said at least partially overlapping passage openings of the at least two organo sheet blanks, the organo sheet blanks are thereby connected to one another in a positively locking manner at the overlapping portions.

By way of example, the passage openings on the organo sheet blanks can be formed by needles. An organo sheet blank can thus be attached, for example in a receiving country, to a tool portion which is provided with a plurality of needles in order to generate passage openings in the organo sheet blank. The at least one further organo sheet blank can subsequently be attached to the same tool portion provided with needles in order to also generate passage openings on said organo sheet blank. Here, those portions of the organo sheet blanks which are respectively provided with the passage openings can already be arranged so as to at least partially overlap one another by way of the attachment to the tool portion. In a subsequent processing step, while maintaining the provided arrangement, plastic material can then be at least partially overmolded on, and injected through, the organo sheet blanks with the passage openings formed by the needles in such a way that the plastic material penetrates in still liquid form through the passage openings and thus, after curing, the organo sheet blanks are connected to one another in a positively locking manner by way of the plastic material at the portions provided with the passage openings.

In one or more embodiments, a portion of a decorative surface of the vehicle door is formed by way of injection-molded plastic material, said decorative surface facing toward a vehicle interior and being visible on the vehicle door when the door module and the vehicle door are in the properly assembled state. As an example, at least one part of a visible surface of the vehicle door is thus already formed by way of plastic material which is injection-molded onto the organo sheet, it not being necessary for said surface to additionally be covered by a cladding component such as for example a panel.

As an example, with a view to forming at least one portion of a visible (decorative) surface on the finished vehicle door by way of plastic material which is injection-molded onto an organo sheet blank, it may be advantageous for at least one organo sheet blank to be preformed prior to introduction into a shaping tool, by means of which the door module is shaped with its final contour. The preforming of the organo sheet blank means that said organo sheet blank is already of contour-close form (with respect to the final contour of the finished door module) prior to the final shaping and a subsequent injection-molding process. In this way, a narrow tolerance is in particular more easily possible and the risk of flaws on that part of a decorative surface which is defined by the injection-molded plastic material can be reduced.

In order to not increase the manufacturing outlay to an excessive extent, provision can also be made in such a design variant for at least one of the organo sheet blanks to not be preformed prior to introduction into the shaping tool. By way of example, it is consequently then the case that at least one organo sheet blank is preformed, whereas at least one other organo sheet blank is not preformed. A preforming operation can thus be concentrated for example on those organo sheet blanks on which at least one part of a decorative surface is intended to subsequently be formed by way of injection-molded plastic material.

In principle, provision can be made in one design variant that during introduction into a shaping tool, by means of which the door module is shaped with its final contour, at least one of the organo sheet blanks is fixed to a part of the tool by way of fixing elements before at least a further one of the organo sheet blanks is introduced into the tool. This may be advantageous for example for a desired arrangement of different organo sheet blanks against one another in the tool, in particular prior to a subsequent injection-molding process. For the fixing of an organo sheet blank in a shaping tool, the fixing elements can be configured for example in the form of needles and/or clamping pins. By means of fixing elements configured in the form of needles, it is then possible, for example as explained above, for passage openings to also be generated on an organo sheet blank when the organo sheet blank is fixed in the shaping tool.

Alternatively or additionally, organo sheet blanks made from the at least two different types of organo sheets can be draped in a tool, by means of which the door module is shaped with its final contour. This is in particular understood to mean that organo sheet blanks made from different types of organo sheet, having a different extent and thus size and/or having a different orientation within the shaping tool, are arranged on curved and/or angled surfaces of the tool in such a way that the organo sheet blanks are already arranged relative to one another, and possibly partially against one another, on the shaping tool in such a manner as is intended for the formation of the different regions of the door module with organo sheet.

A further aspect of the present disclosure relates to a door module for a vehicle door, in the case of which door module, in addition to an areal carrier region which is substantially formed by an organo sheet and to which at least one functional component of the vehicle door is to be fixed, at least one further (functional) region of the door module, said further region bordering a window opening in the vehicle door when the door module is in the properly assembled state, is substantially formed by an organo sheet.

Here, it is in principle possible for the carrier region and the at least one further region of the door module to be formed by an identical type of organo sheet or by different types of organo sheets. Particularly in the latter case, this aspect of the proposed solution can be readily combined with a design variant of the first aspect of the proposed solution explained above.

By way of example, the at least one further region, which is likewise formed by an organo sheet, is part of a window sill and/or of a (window) frame which defines the window opening for the vehicle door.

In the context of a production method for a door module, in the case of which, in addition to a carrier region, at least one further region of the door module is formed by an organo sheet, provision can for example be made for the at least one further region to be at least partially formed by an organo sheet blank made from a type of organo sheet with which the carrier region is also formed.

Alternatively or additionally, the at least one further region can be at least partially formed by an organo sheet blank of a type of organo sheet which differs from that type of organo sheet which is used for the organo sheet blank for the carrier region. This aspect of the proposed solution is consequently based on the fundamental concept that it is not only possible for a carrier region of a door module to be formed from a (first type of) organo sheet, but rather that at least one further functional region of the door module at a window opening which is at least also defined by the door module is formed by an organo sheet, in particular by means of at least one further, different type of organo sheet. When at least one further type of organo sheet is used, it is then possible for said further type of organo sheet, for example in light of the loading which occurs in the region of the window opening during operation, to have at least one fiber layer more and/or to be formed with a greater material thickness than the first type of organo sheet which is utilized for the formation of a large part of the carrier area (that is to say for more than 50%, in particular more than 60%, 70% or 80%, of the carrier area).

The aspect already explained above, which relates to the formation of at least one portion of a visible decorative surface on the assembled vehicle door by way of plastic material which is injection-molded onto an organo sheet of a door module, is apparent independently of the formation of a door module using different types of organo sheets, and also independently of the formation of at least one further functional region of the door module by way of organo sheet. Correspondingly, independently of this, a further aspect of the proposed solution relates to a vehicle door in the case of which at least one (bearing) region is substantially formed by organo sheet and in the case of which at least one portion of the vehicle door, said portion facing toward a vehicle interior and forming a visible decorative surface when the vehicle door is in the properly assembled state, is formed by a plastic material which is injection-molded onto the organo sheet.

In that portion of the decorative surface which is formed by injection-molded plastic material, it is thus possible for additional cladding components, and thus in particular panels, to be omitted. Here, there is consequently already a part of a decorative surface for the vehicle door already at the end of an injection-molding process.

In one or more embodiments, at least one part of a decorative surface on a frame region for a window frame of the vehicle door is formed for example by the plastic material which is injection-molded onto the organo sheet. In contrast to hitherto customary constructions, paneling of the window frame is thus no longer required on said frame region.

In a corresponding production method for a vehicle door, at least one region of the vehicle door is consequently formed with an organo sheet blank on which plastic material is injection-molded, said plastic material then forming at least one portion of a visible decorative surface on the vehicle door. Here, the region formed with organo sheet, in particular a bearing region formed with organo sheet, of the vehicle door can be provided on a door module of the vehicle door.

As an example, advantages and features explained above and below in conjunction with a production method also apply for design variants of a corresponding door module and/or of a corresponding vehicle door, and vice versa. Furthermore, the aspects of the proposed solution which are mentioned above and below can be readily combined with one another.

BRIEF DESCRIPTION OF THE DRAWINGS

The attached figures illustrate possible design variants of the proposed solution in exemplary fashion.

In detail:

FIG. 1 shows an exploded illustration of the basic structure of an exemplary embodiment of a vehicle door and of a proposed door module, which integrates a window frame for a window opening of the vehicle door;

FIG. 3 schematically shows the vehicle door looking at the inner side and illustrating different regions of the door module, which are formed with different types of organo sheets;

FIG. 4 shows an enlarged illustration of a section Z of FIG. 3;

DETAILED DESCRIPTION

Figure 2B:
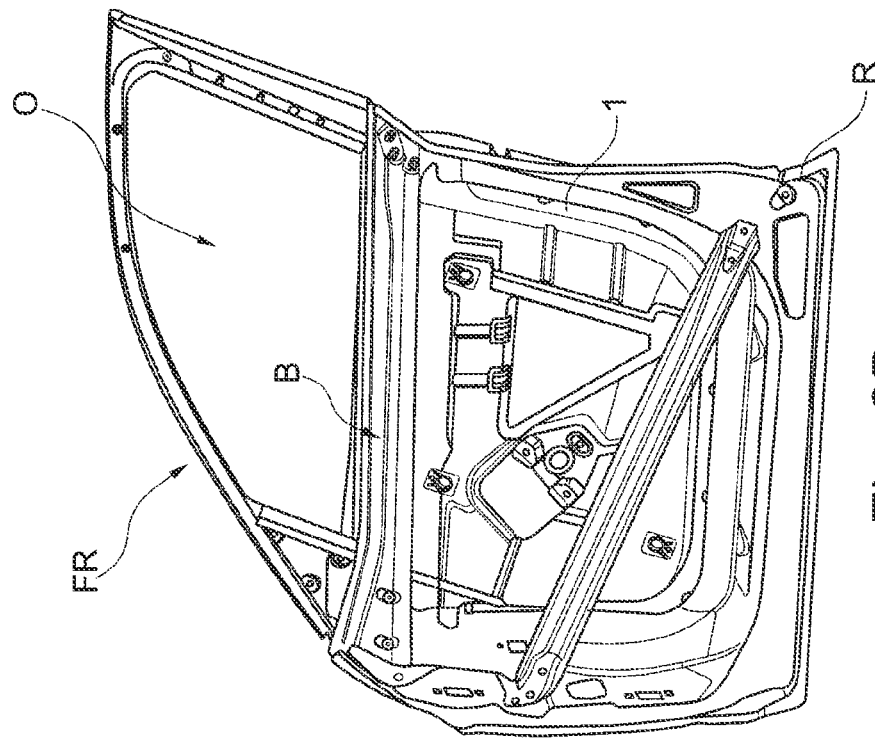
FIGS. 2A-2B show the door module of FIG. 1 assembled on a bodyshell of the vehicle door, looking at an inner side of the vehicle door (FIG. 2A) and at an outer side of the vehicle door (FIG. 2B)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Organo sheet is a fiber composite material, typically in the form of a semifinished fiber-matrix product. In the case of such a fiber composite material, (reinforcing) fibers are embedded in a plastic, typically in a thermoplastic or thermosetting plastic. Here, the fibers can be embedded in particular in the form of laid scrims, woven fabrics, knitted fabrics or so-called UD tapes (that is to say unidirectional tapes) composed of glass, Kevlar, carbon or plastic fibers, that is to say in particular carbon, aramid or natural fibers, in a thermoplastic or thermoset matrix. Examples of suitable thermoplastic for the matrix are polypropylene (PP) or polyamide (PA) on account of the good adhesive properties with respect to the fibers. The embedded fibers are frequently continuous fibers, and so a continuous-fiber-reinforced plastic is also spoken of.

The characterization "continuous-fiber-reinforced" is understood to mean that the length of the fibers serving for reinforcement is limited substantially by the size of a typically plate-like organo sheet. Within the organo sheet, a fiber is generally not interrupted.

The fact that the carrier region is substantially formed by organo sheet means in this case that the organo sheet forms that part of the carrier region which is subjected to the majority of the forces occurring under normal operating conditions. Here, this may in particular be that part of the carrier region on which one or more guide rails of a window regulator are provided. A part (which for example bears one or more guide rails or which integrally forms at least one guide rail and is coherent) of the carrier region composed of organo sheet or a plurality of parts (which for example bear one or more guide rails or which integrally form at least one guide rail) of the carrier region composed of organo sheet extend for example over approximately 30% or more of the area of the carrier region. In particular, the organo sheet can extend over more than 40% and generally over at least 50% of the area of the carrier region, and therefore the organo sheet thus also forms a corresponding proportion of more than 40% or approximately 50% or more of the surface of the carrier region. In order to fully utilize the strength advantages of the organo sheet, attempts are generally made to maximize the proportion of the organo sheet on the area of the carrier region. A multi-part configuration of the organo sheet on a carrier region is not ruled out here.

A main constituent of the door module is for example a plate-like semifinished product composed of an organo sheet. The organo sheet thus for example defines a substantial areal extent of the door module, but can also be supplemented by further components or materials. By way of example, it is thus possible for metallic elements and/or plastic elements to be incorporated in the organo sheet or attached to the organo sheet.

Particularly in the automotive sector, and here for example for the production of vehicle doors, organo sheet is nowadays already used in different forms. Here, provision is typically made for merely the carrier region of a door module to be at least partially manufactured from a particular type of organo sheet and plastic material, for example for the formation of interfaces, to be injection-molded thereon. The organo sheet with the plastic material injection-molded thereon is then frequently covered by cladding components which are additionally provided on a vehicle door.

FIG. 1 shows an exploded illustration of a vehicle door T, in the case of which a door module 1 forming a window frame FR is assembled on a bodyshell assembly which is referred to hereinafter as bodyshell R. The bodyshell R typically comprises a door outer skin and a door inner skin which is rigidly connected thereto. The bodyshell R defines a wet space for accommodating functional components of the vehicle door T, said wet space being sealingly separated from a dry space facing toward the vehicle interior by way of a carrier area 10 of the door module 1.

Figure 2A:
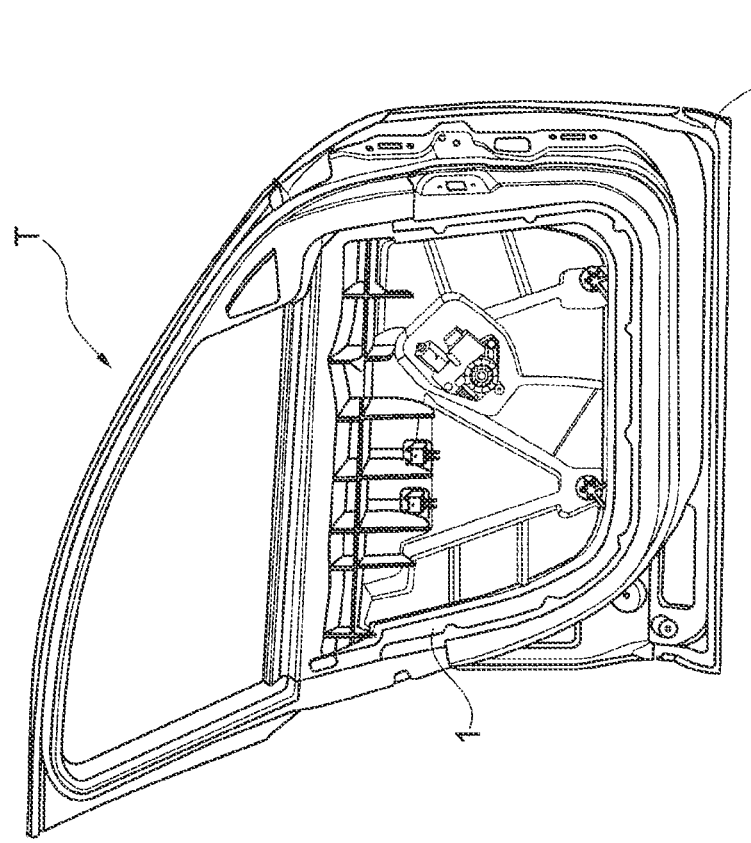

Different functional components of the vehicle door T, for example components of a window regulator, a speaker and/or components of a door lock, are fixed to the carrier area 10, which extends beneath a window sill B of the assembled vehicle door T in accordance with FIGS. 2A and 2B. Further functional components can for example be sensors which are to be provided on or in the vehicle door T. By way of example, in FIG. 12, guide rails 2A and 2B and a drive A, as functional components of the window regulator, are arranged on the carrier area 10, specifically on an outer side of the carrier area 10, said outer side facing toward the door outer skin of the bodyshell R. An inner cladding part I, which covers the carrier area 10 in the assembled state of the vehicle door, is provided on the side of the interior.

In the present case, the door module 1, which in FIGS. 2A and 2B is illustrated in two different side views in its state assembled on the bodyshell R, is produced from organo sheet, and thus in one-piece form from a fiber composite material. This applies in particular for the window frame FR which extends above the window sill B and which borders a window opening O on the vehicle door T. A connection between the bodyshell R and the door module 1 is effected for example by way of screw connections. Alternatively or additionally, at least one rivet connection and/or an adhesive connection can be provided.

In the case of the door module 1 illustrated in FIGS. 2A and 2B, at least in one portion of the window frame FR which extends above the sill B, there is no panel provided for covering an organo sheet of the door module 1 in said region. Rather, provision is made here for a frame region 12 of the door module 1, said region at least partially forming the window frame FR, to be covered, at least on its side facing toward the vehicle interior, by injection-molded plastic material in such a way that at least one part of a visible decorative surface of the finished vehicle door T is formed thereby. Here, at least one portion of a decorative surface of the vehicle door T in the region of the window frame FR is consequently formed, on the door module side, by the injection-molded plastic material.

The frame region 12 is illustrated in particular in FIG. 3, which schematically shows a side view of the vehicle door 1 with the door module 1 assembled on the bodyshell R. In addition to the areal carrier region 10 which is provided beneath the window sill B and the frame region 12 which extends above the window sill B and defines the window frame FR, the door module 1 in this case also has a reinforcing region 11 in the region of a mirror triangle and directly adjacent to the window sill B. In this case, the reinforcing region which is elongate here consequently extends along a door-module-side sill region.

In the design variant illustrated, different types of organo sheets are used in the three regions 10, 11 and 12 of the door module. The different types of organo sheets, which are combined with one another here in the door module 1, in this case permit a function-specific design of the different regions 10, 11 and 12 in a comparatively simple manner. The individual regions 10, 11 and 12 can for example be formed with blanks made from different organo sheets. The different types of organo sheets differ here with regard to their material thickness. However, the organo sheet types can additionally also differ from one another with regard to the materials of their reinforcing fibers, the alignment of the reinforcing fibers and/or the number of fiber layers present. In this way, a laminate is formed from partially overlapping individual layers, in the case of which the layer thicknesses of the organo sheets used differ from one another in the respective regions 10, 11 and 12 by way of load-appropriate selection.

Here, the organo sheets can in principle each have a thermoplastic, but also thermoset matrix and be optionally reinforced with at least one metallic insert. By way of example, polypropylene (PP) or polyamide (PA) is used for the thermoplastic matrix. Reinforcing fibers of the respective organo sheets are for example composed from glass, carbon or aramid. Alternatively or additionally, natural fibers can also be used.

In the design variant illustrated, an organo sheet having a single-layered woven fabric or single-layered laid scrim is used for example for the carrier region 10, wherein the organo sheet has a material thickness in the range from 0.4 mm to 1 mm, for example in the range of 0.6 mm here. In the reinforcing region 11 which is close to the sill, a multi-layered woven fabric or laid scrim is provided, and also a material thickness in the range from 0.9 mm to 4 mm, for example in the range from 1 mm to 1.5 mm. A material thickness in the range from 1.8 mm to 4 mm, in particular in the range from 2 mm to 2.5 mm, is in turn provided in the frame region 12, wherein the fibers here are aligned unidirectionally to a comparatively great extent. The individual regions 10, 11 and 12 are thus of differing thickness and formed with a different number of fiber layers. Moreover, in the reinforcing region 11, there is at least one continuous overlap provided either with at least one portion of the carrier region 10 or with a portion of the frame region 12 (for example in the region of the mirror triangle).

Correspondingly to the enlarged illustration of FIG. 4, the use of different types of organo sheets means different types of organo sheets bear against one another and on top of one another at node regions K, and also plastic material is applied in particular to such node regions K, for example for the formation of an injection-molded portion 120 for a part of a frame-side decorative surface. This is to be taken into account in the production method of the door module 1.

The structure of the door module 1 and its production are illustrated with further details on the basis of FIGS. 5A to 14. For the sake of simplicity and for better identifiability of individual details, the door module 1 is illustrated here in each case only in sections in the manner of a so-called demonstrator module, and therefore merely a section of the frame region 12, a section of the frame region 11 and a section of the areal carrier region 10 are evident in each case here. Correspondingly, in FIGS. 5A to 14, the door module 1 is illustrated merely at maximum with a length a and a width b, which correspond in each case to a fraction of the total length and the total width, respectively, of the door module 1 in its finished shape.

Figure 5B:
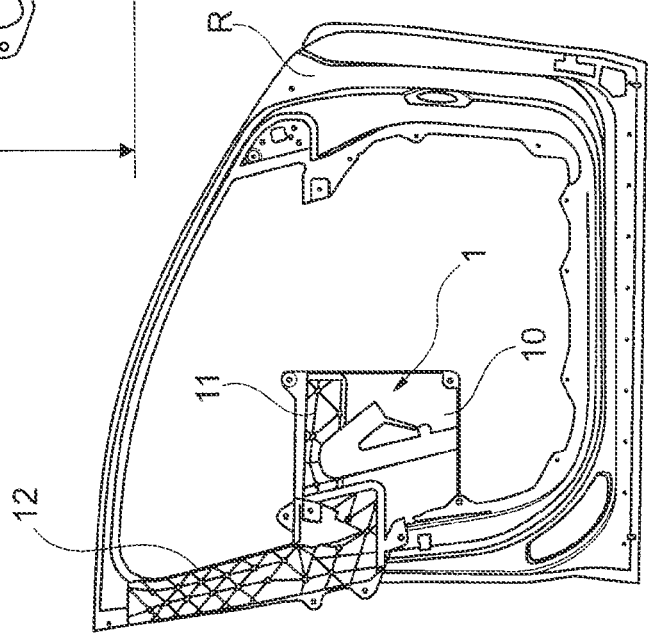
FIGS. 5A-5B show an example of a proposed door module, which is formed with different types of organo sheets, assembled on the bodyshell of the vehicle door and looking at an inner side (FIG. 5A) and an outer side (FIG. 5B)
Figure 5A:
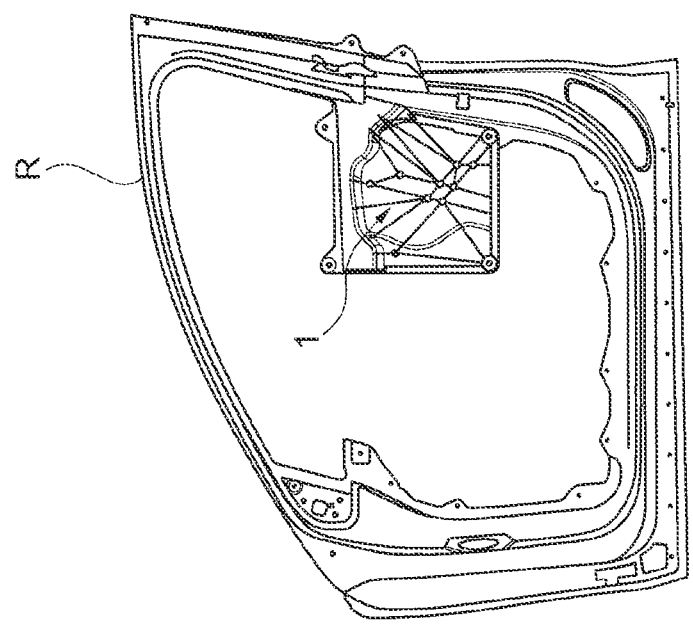

FIGS. 5A and 5B show the door module 1 in its state when connected as intended to the bodyshell R, looking at an inner side and an outer side of the vehicle door T. From this, in particular in conjunction with the individual illustrations of FIGS. 6, 7A and 7B, it is evident that the regions 10, 11 and 12 of the door module 1 are formed with different blanks of organo sheets of different types. Whereas a blank for the reinforcing region 11 in this case completely overlaps an edge, which is close to the sill, of the blank provided for the carrier region 10, there is merely a partial overlap provided between the blank for the frame region 12 and the blank for the carrier region 10 in order to ensure a connection of the blanks on the finished door module 1.

Plastic material is in each case injection-molded onto the blanks of organo sheets for the formation of the individual regions 10, 11 and 12. Injection-molded sections and overmolded sections of the individual blanks can be produced from different plastic materials here. Alternatively, different elements and regions can be formed by a plastic material, such as, for example, PP LGF 30, by means of injection molding on the (organo sheet) blanks.

By way of example, an injection-molded portion 101 is thus provided on the door module 1, fastening openings being formed on the edge side of the respective regions 10, 11 and 12 by way of said portion. The door module 1 is fixed to the door inner skin of the bodyshell R by way of the fastening openings of the injection-molded portion 101. At least some of the edge-side fastening openings formed on the injection-molded portion 101 can also be used for fixing functional components to the door module 1. Reinforcing ribs 100 which are injection-molded with the plastic material are also shaped on an inner side of the carrier area 10 of the door module in order to at least locally stiffen the carrier region 10 and/or in order to locally stiffen any fastening openings.

An injection-molded portion 120 is also formed on the inner side of the frame region 12 by way of the plastic material, said injection-molded portion forming a part of a frame-side decorative surface. In this case, for example a portion of a decorative surface with a grained visual appearance is then formed by way of the injection-molded portion 120 composed of plastic material which is injection-molded onto the frame region 12, and therefore separate paneling is no longer required at least over a part of the frame region 12 (see in particular FIG. 7A).

Figure 7B:
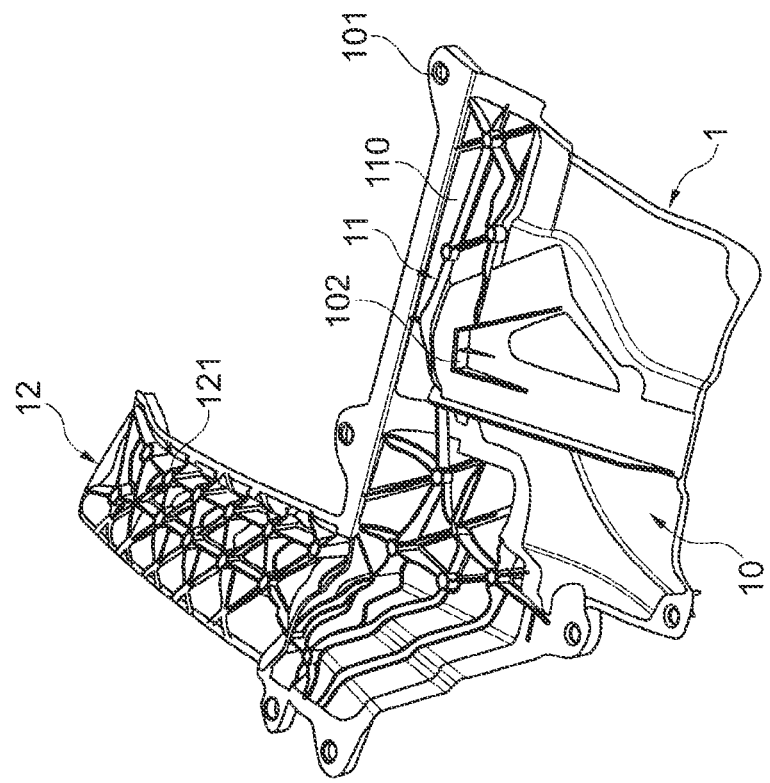
FIGS. 7A-7B show various perspective illustrations of the door module of FIGS. 5A and 5B looking at an inner side (FIG. 7A) and an outer side (FIG. 7B)
Figure 7A:
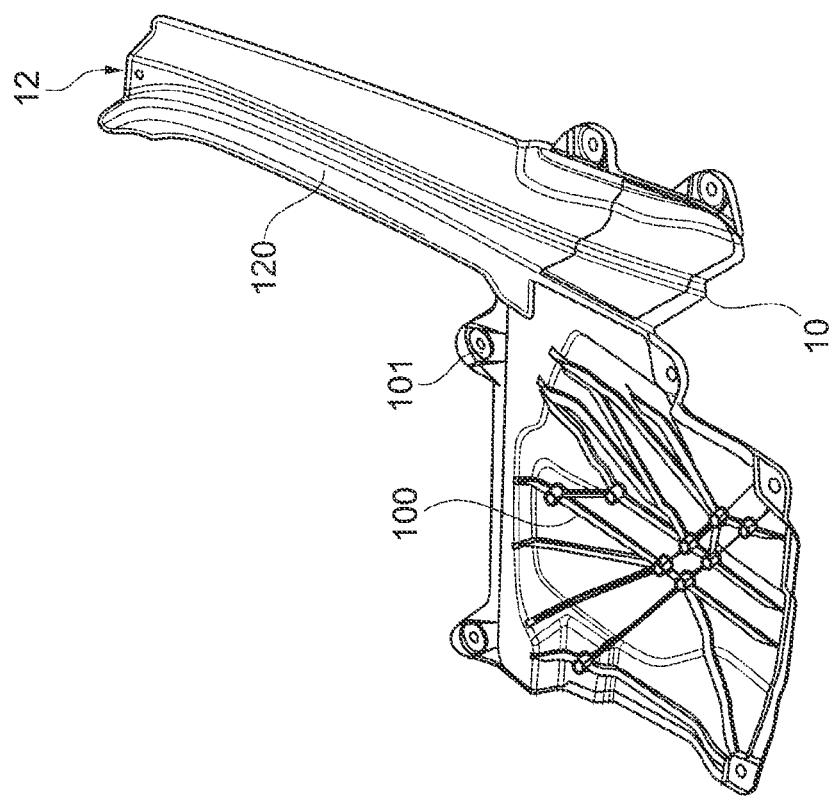

On an outer side of the door module 1, correspondingly to FIG. 7B, reinforcing ribs are likewise formed by way of an injection-molded portion 121 on the frame region 12. The reinforcing region 11 is also reinforced by way of an injection-molded portion 110 with reinforcing ribs. On the outer side illustrated in FIG. 7B, it is also possible for a part of a guide rail 2A, 2B, or alternatively a bearing point at least for a guide rail 2A, 2B of the window regulator, to be shaped by way of an injection-molded portion 102 on the carrier region 10.

The door module 1 illustrated is distinguished by the use of organo sheets of differing thickness which are formed onto one another and patched, and which are first thermoformed in a shaping tool in order to form the door module 1. After the shaping by means of the tool, an injection-molding function is performed in the same tool in order to form interfaces, functional regions (such as, for example, the guide rails 2A, 2B in the injection-molded portion 102) and stiffening ribs. Details relating to design variants of a production method are illustrated on the basis of FIGS. 8A to 14 which are explained below.

Figure 6:
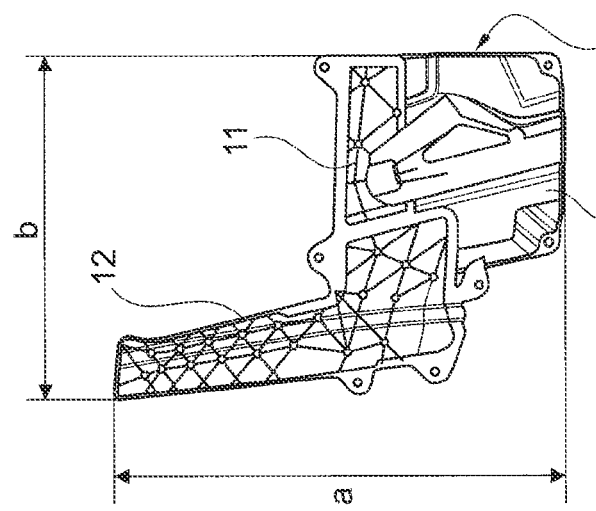
FIG. 6 shows an enlarged illustration of the door module of FIGS. 5A and 5B.
Figure 8B:
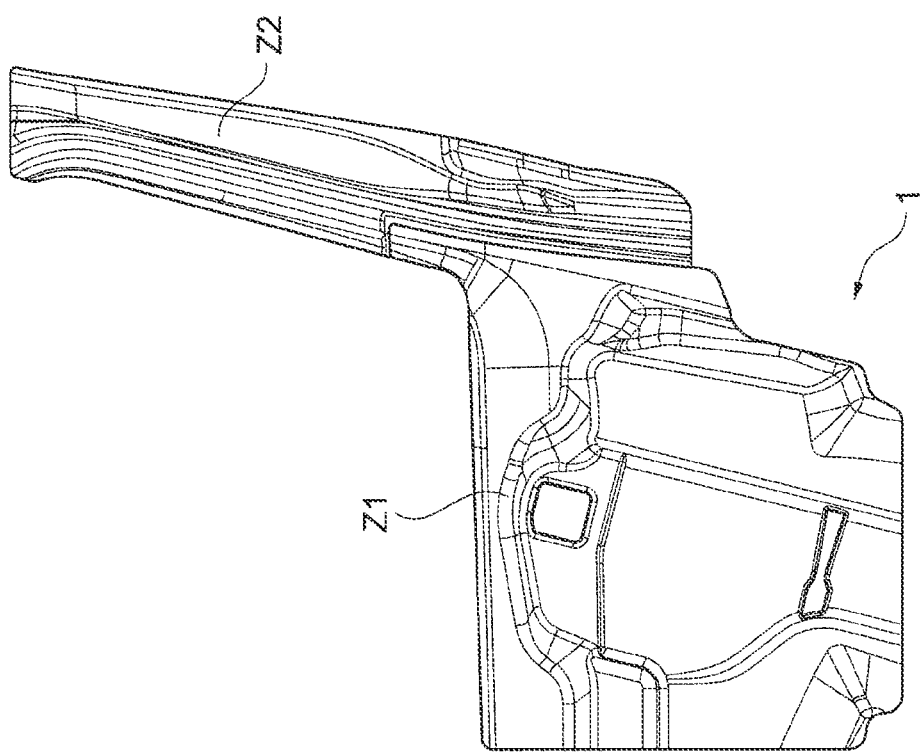
FIGS. 8A-8B show the door module of FIGS. 5A to 7B without plastic material injection-molded thereon and highlighting different organo sheet blanks which are formed from different types of organo sheets.
Figure 8A:
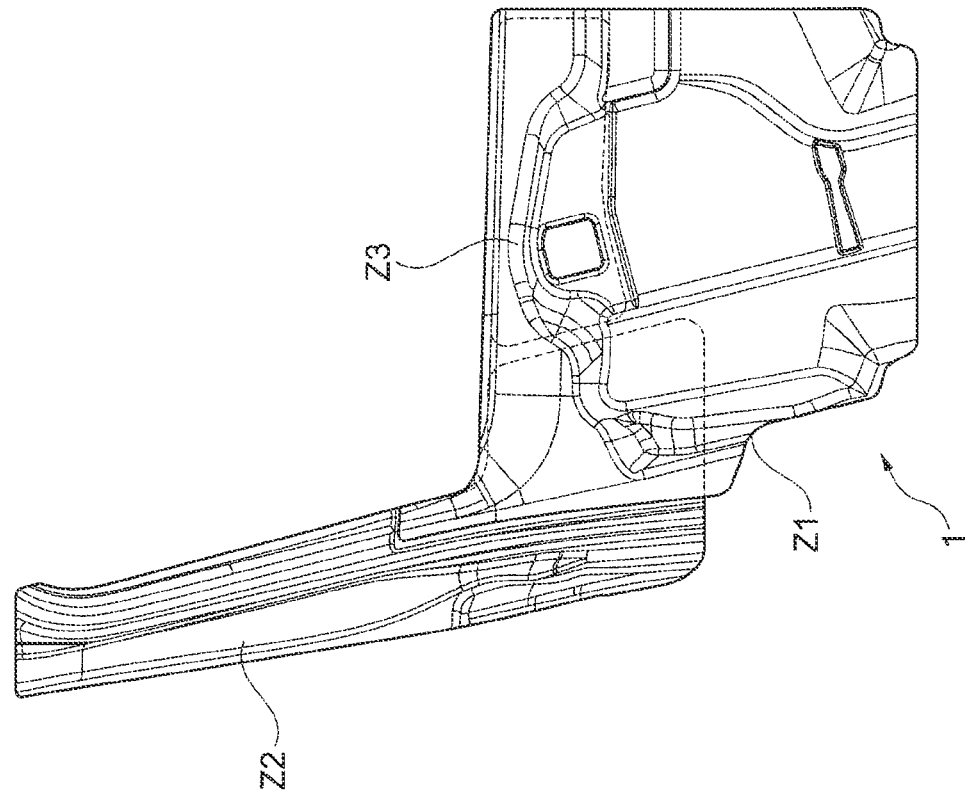

FIGS. 8A and 8B thus initially show the door module 1 of FIGS. 6 to 7B without the plastic material injection-molded thereon, looking at the outer side (FIG. 8A) and the inner side (FIG. 8B). In FIGS. 8A and 8B, blanks Z1, Z2 and Z3 with which the functionally and spatially separated regions 10, 11 and 12 of the door module 1 are formed are highlighted in this case. Here, a first blank Z1 is composed of an organo sheet of a first type having a material thickness in the range of 0.6 mm. The blank Z1 in this case has merely one fiber layer, for example. A second blank Z2 is composed of an organo sheet of a second type for the formation of the frame region 12. The organo sheet of the second type for the second blank Z2 for the frame region 12 has several (at least two) fiber layers, in particular possibly a UD tape, and also a material thickness in the range from 2.0 mm to 2.5 mm with a comparatively great unidirectional fiber alignment. A third blank Z3 for the reinforcing region 11 is composed of an organo sheet of a third type and can likewise have several fiber layers. A material thickness of the organo sheet of the third type in this case lies in the range from 1 mm to 1.5 mm.

In the design variant illustrated, provision can in principle be made for the reinforcing fibers for all three blanks Z1, Z2 and Z3 to in each case be provided in single-layered or multi-layered woven fabrics, laid scrims, knitted fabrics or in UD tapes and to be configured in the form of glass fibers in a thermoplastic matrix.

Figure 9:
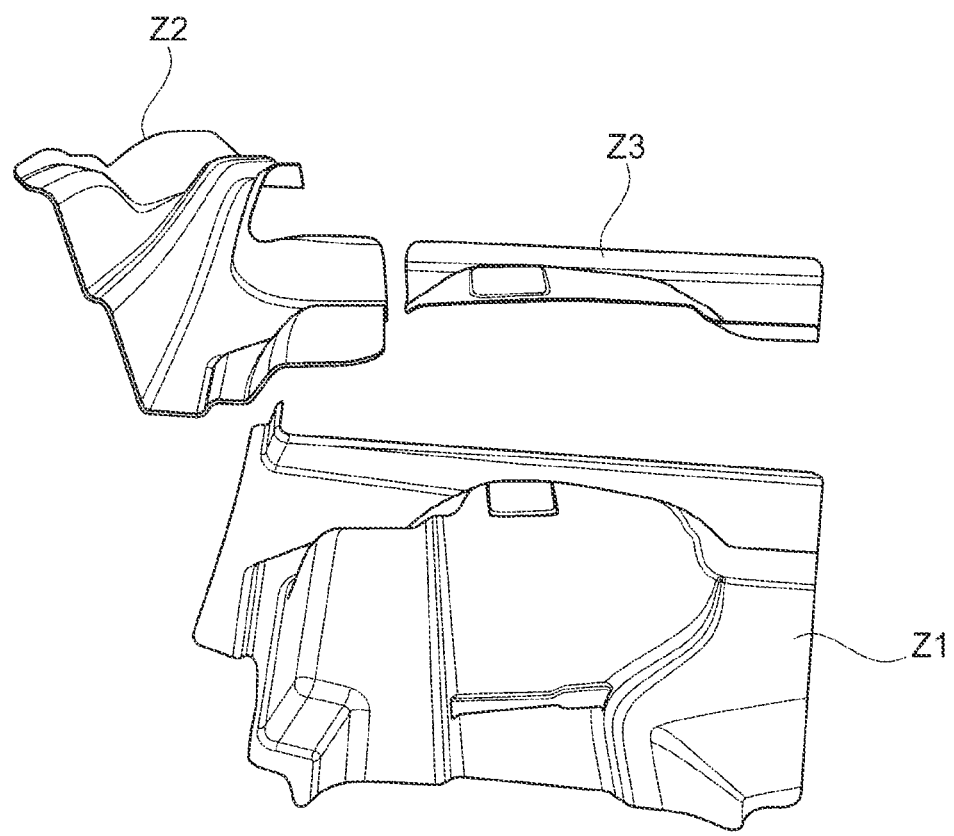
FIG. 9 shows the organo sheet blanks of the door module in an exploded illustration.
Figure 13:
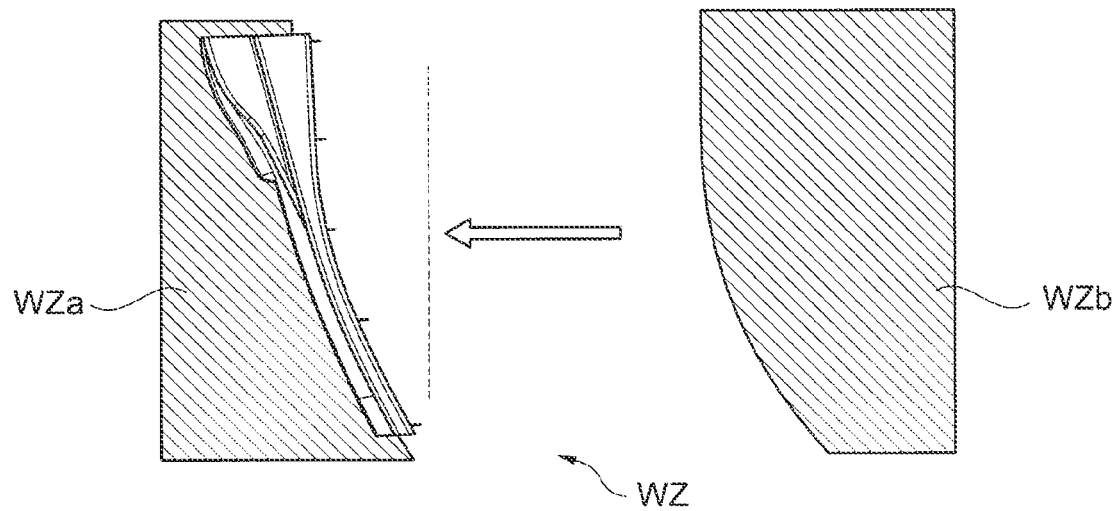
FIG. 13 schematically shows two mutually opposite tool sides of the open (forming) tool, having an organo sheet blank which is attached on one side of the tool and needle-mounted thereon in accordance with FIG. 12.

Correspondingly to the exploded illustration of FIG. 9, the individual blanks Z1, Z2 and Z3 are first produced separately from the different types of organo sheets and then used to form the door module 1 by means of a shaping tool W (see FIG. 13).

Figure 10:
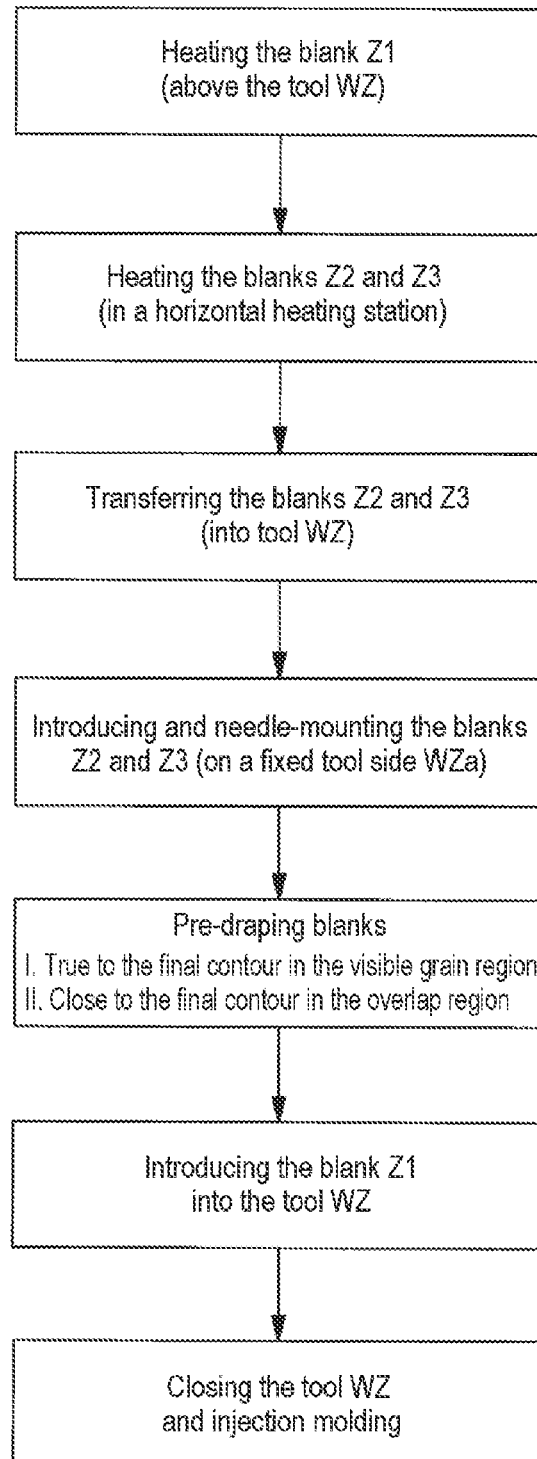
FIG. 10 shows a flow diagram for a design variant of a proposed production method for producing the door module.

In the case of a production method which is illustrated in exemplary fashion on the basis of the flow diagram of FIG. 10, a process sequence is then for example provided as follows:

1. First, the areal blank Z1 which substantially forms the carrier region 10 is heated, specifically above the actual (forming) tool WZ which is sketched in an exemplary and schematic manner in FIGS. 12 and 13.

2. The blanks Z2 and Z3 are subsequently heated in a heating station, for example a horizontal heating station.

3. The blanks Z2 and Z3 are subsequently transferred into the tool WZ, for example by means of a needle gripper.

4. In this case, the blanks Z2 and Z3 are attached to a fixed tool side WZa of the tool WZ and needle-mounted on needles N of the tool WZ.

5. The blanks Z2 and Z3 are then pre-draped inside the tool WZ. For the frame region 12, on which the injection-molded portion 120 for forming a part of a frame-side decorative surface is injection-molded, the blank Z2 in particular is pre-draped in a manner which is as true to the final contour as possible. In order to pre-drape the blanks in a manner which is true to the final contour, contact to the tool WZ is provided over as large an area as possible, in particular in order to achieve comparatively great cooling prior to the overmolding with plastic material. Elsewhere, the pre-draping of the blanks in a manner which is close to the final contour may be sufficient. By way of example, merely draping of the blanks Z2 and Z3 in a manner which is close to the final contour is required in an overlap region of the blanks Z2 and Z3. Here, there is correspondingly only pointwise contact made with the tool WZ for slower cooling.

6. Whereas a manufacturing machine was fully open for the introduction and needle-mounting of the blanks Z2 and Z3 in the tool WZ and the pre-draping of the blanks Z2 and Z3, said machine is subsequently transferred into an intermediate position. In this intermediate position, the blank Z1 for forming the carrier area 10 is introduced into the tool WZ.

7. Subsequently, the tool WZ is closed and the injection-molding process is carried out in order to shape the individual injection-molded portions 100, 101, 102, 110, 120 and 121 on the blanks Z1, Z2 and Z3 of the different types of organo sheets, said blanks being arranged in the forming tool WZ.

In the context of the proposed design variant, the blanks Z2 and Z3 having greater material thickness, which therefore have a higher heat capacity, are consequently arranged on the tool WZ at an earlier stage and pre-formed, before a blank Z1 made from a thinner organo sheet is transported into the tool WZ. In this case, in addition to the manufacturing machine which receives the tool WZ, the blanks Z2 and Z3 can already be formed in a suitable station at forming temperature. Such a heating station for example has an IR emitter or a circulating air oven.

In the context of the transfer of the blanks Z2 and Z3 into the tool WZ, the blanks can be already preformed and at least partially consolidated. Here, a handling system provided for the transfer can then simultaneously be used as a performer, for example. Once the handling system has been moved out of the tool WZ after the preforming and the arrangement of the blanks Z2 and Z3 in the tool WZ have been completed, the thinner blank Z1 is introduced into the tool WZ. In this case, the thinner blank Z1 has been heated for example above a cavity of the tool WZ, for example above an IR emitter field. In this connection, provision can also be made that it is necessary for merely a linear displacement into the tool WZ to be carried out in order to supply the thinner blank Z1.

Figure 11:
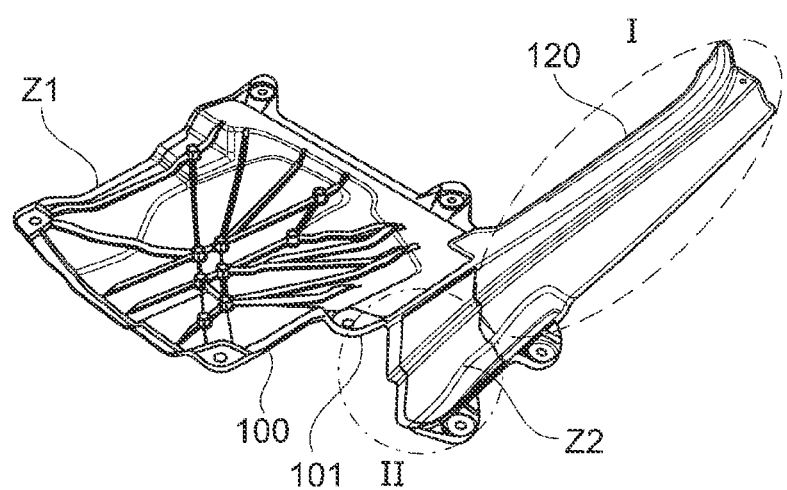
FIG. 11 shows a perspective view of the door module looking at an inner side and highlighting portions on which two substeps of the production method are performed.

In the design variant illustrated, during the production process the blank Z2 is in particular pre-draped on those subregions of the frame region 12 which are highlighted with I. and II. in FIG. 11. In the subregion I. on which the covered part of the frame region 12 is generated by way of injection-molded plastic material, complete consolidation may be carried out in order to ensure complete overmolding with the plastic material, for example PP LGF 30 here. There is also no overlapping join of two blanks in said subregion, and therefore the surface temperature does not predominate for the process times and the overmolding of the relatively cold organo sheet blank Z2 for the visual graining to be provided by way of the injection-molded plastic material makes process-reliable conditions possible.

By contrast, in the subregion II., pre-draping with pronounced embossing of the blank Z2 takes place in a manner which is close to the final contour. Here, a relatively large process window is consequently available, since slower cooling takes place without tool contact.

Figure 12:
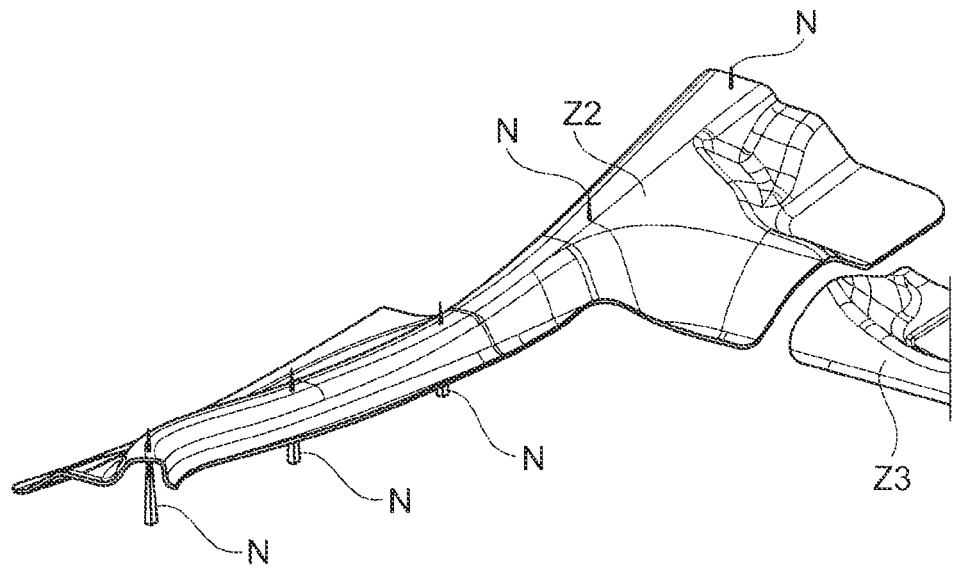
FIG. 12 shows a perspective view of organo sheet blanks of the door module during the needling onto a shaping tool.

FIGS. 12 and 13 show further details for the production process. In said figures, it is in particular possible to see needles N which are configured on a fixed tool side WZa of the tool WZ and on which the blanks Z1, Z2 and Z3 made from organo sheet—for example the blank Z2 provided for the frame region 12 in FIGS. 12 and 13—can be needle-mounted in order to fix the corresponding blank on the tool WZ. In principle, corresponding needles N could in this case also be provided on an opposite tool side WZb, but are not illustrated in FIG. 13.

During the fixing of the blanks Z1, Z2 and/or Z3 to the tool WZ, the needles N can also be used to generate passage openings on the respective blank. In particular, such passage openings can be generated in overlap regions of at least two blanks Z1 to Z3. Plastic material can then be introduced through said passage openings of a plurality of blanks Z1 to Z3, said openings then at least partially overlapping, and therefore portions of the blanks Z1 to Z3 which lie on top of one another in the overlap region have the injection-molded plastic material injected therethrough and are thereby fixed to one another in a positively locking manner when the plastic material is cured. By means of the plastic material which is injected through the passage openings, it is consequently possible for the blanks Z1 to Z3 to be "riveted" to one another by way of the plastic material.

Figure 14:
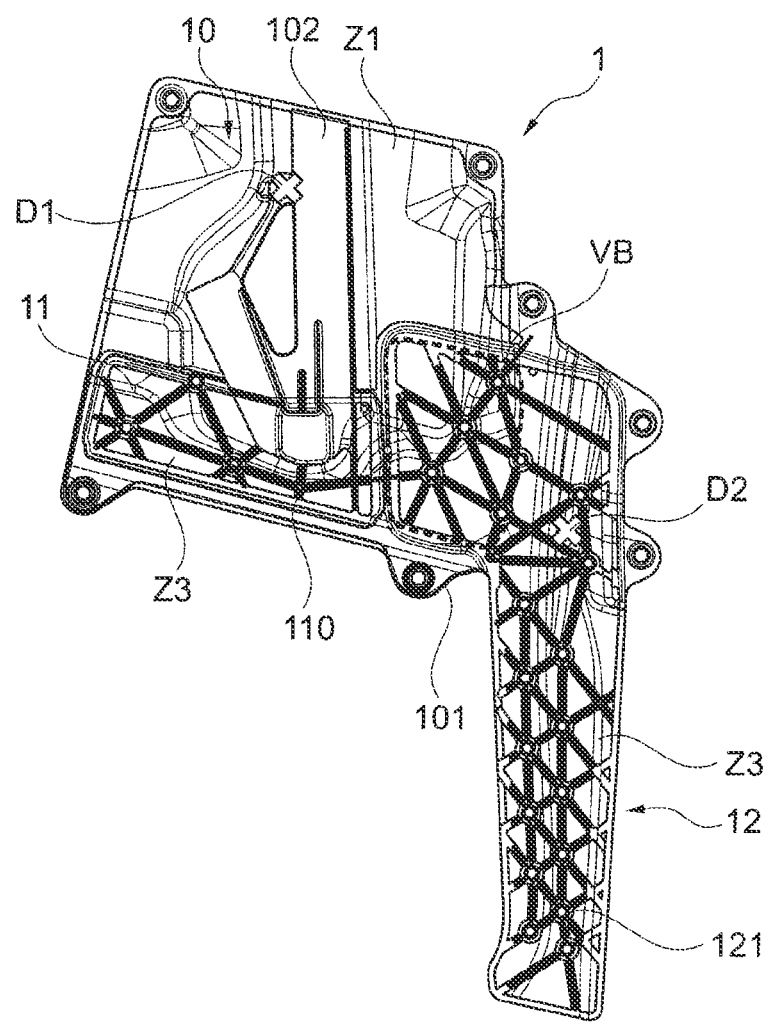
FIG. 14 shows a rotated view of the door module looking at the outer side and highlighting a region for an advancing slide in the tool and two nozzle positions for an injection-molding process, by means of which the illustrated structures of plastic material on the door module carrier are generated.

In this connection, FIG. 14 shows possible nozzle positions D1 and D2 for the plastic material to be injected. In addition, an advancing slide region VB is illustrated in FIG. 14. At said advancing slide region VB, the tool WZ can be used to realize a local preforming operation which runs ahead of the actual shaping operation. In the advancing slide region VB, in which an overlap region of a plurality of blanks Z1 to Z3 is also provided, it is for example possible for slight overpressing by 0.1 mm to 0.2 mm to take place.

In a deviation from the design variant illustrated, it is of course possible for the door module 1 to have merely two different types of organo sheet or more than three different types of organo sheets, which are connected to one another to form the door module and are optionally fixed to one another by way of injection-molded plastic material. In this case, the different types of organo sheets can differ from one another not only with regard to their material thickness and the number of fiber layers present but also by the materials of their reinforcing fibers and/or alignment of said reinforcing fibers.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE DESIGNATIONS

1 Door module
10 Carrier region
100 Injection-molded portion with reinforcing ribs
101 Injection-molded portion with fastening openings
102 Injection-molded portion
11 Reinforcing region
110 Injection-molded portion with reinforcing ribs
12 Frame region
120 Injection-molded portion with part of a frame-side decorative surface
121 Injection-molded portion with reinforcing ribs
2A, 2B Guide rail (functional component)
A Drive (functional component)
a Length
B Window sill
b Width
D1, D2 Nozzle position
FR Window frame
I Inner cladding part
K Node region
N Needle
O Window opening
R Bodyshell
T Vehicle door
VB Advancing slide region
WZ Tool
WZa, WZb Tool side
Z1, Z2, Z3 Blank While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A door module for use in a vehicle door, the vehicle door including a body shell provided with an inner door skin and an outer door skin, the door module configured to be mounted to the body shell and comprising:
   a first type of organo sheet forming a first region of the door module; and
   a second type of organo sheet forming a second region of the door module,
   wherein the door module is configured to separate a wet space from a dry space within the vehicle door, wherein the dry space is arranged closer to an interior of the vehicle,
   wherein the first type and the second type of organo sheets differ from one another with respect to material thickness, material of reinforcing fibers, the alignment of the reinforcing fibers, and/or a number of fiber layers.

2. The door module of claim 1, wherein the first type of organo sheet includes a single-layered woven fabric, a laid scrim, a knitted fabric or a UD tape and/or a material thickness range between 0.4 mm and 1.0 mm, and the second type of organo sheet includes a multi-layered woven fabric, a multi-layered laid scrim, a multi-layered knitted fabric or a multi-layered UD tape and/or a material thickness range between 0.4 mm to 4.0 mm.

3. The door module of claim 1, wherein the first type of organo sheet and the second type of organo sheet at least partially overlap one another.

4. The door module of claim 1, further comprising:
   a third type of organo sheet forming a third region of the door module.

5. The door module of claim 4, wherein
   the first type of organo sheet includes a single-layered woven fabric, a single-layered laid scrim, a single-layered knitted fabric, or a single-layered UD tape and/or a material thickness range between 0.4 mm to 1.0 mm,
   the second type of organo sheet includes a multi-layered woven fabric, a multi-layered laid scrim, a multi-layered knitted fabric, or a multi-layered UD tape and/or a material thickness range between 0.4 mm to 2.0 mm, and
   the third type of organo sheet includes a material thickness range between 1.8 mm to 4.0 mm.

6. A door module for use in a vehicle door, the door module comprising:
   an areal carrier region substantially formed by a first organo sheet and configured to receive at least one functional component of the vehicle door, wherein the at least one functional component of the vehicle door is configured to be fixed to the areal carrier region; and another region configured to border a window opening defined by the vehicle door when the door module is in an assembled state, wherein the other region is substantially formed by a second organo sheet, wherein the door module is configured to separate a wet space from a dry space within the vehicle door, wherein the dry space is arranged closer to an interior of the vehicle.

7. The door module of claim 6, wherein the other region includes a windowsill and/or a frame collectively defining the window opening.

8. The door module of claim 6, wherein the first organo sheet and the second organo sheet are different types of organo sheets.

9. A vehicle door for use in a vehicle, the vehicle door comprising:

a body shell; and a door module configured to be mounted to the body shell and including, a first region substantially formed by an organo sheet, a first portion configured to face towards an interior of the vehicle and forming a visible decorative surface, wherein the first portion is formed by a plastic material injection-molded onto the organo sheet, wherein the door module is configured to separate a wet space from a dry space within the vehicle door, wherein the dry space is arranged closer to an interior of the vehicle.

* * * * *